United States Patent
Pidcock et al.

(10) Patent No.: US 9,932,903 B2
(45) Date of Patent: Apr. 3, 2018

(54) FUEL MANIFOLD AND FUEL INJECTOR ARRANGEMENT

(71) Applicant: ROLLS-ROYCE PLC, London (GB)

(72) Inventors: Anthony Pidcock, Derby (GB); Paul Ian Chandler, Birmingham (GB)

(73) Assignee: ROLLS-ROYCE plc, London (GB)

( * ) Notice: Subject to any disclaimer, the term of this patent is extended or adjusted under 35 U.S.C. 154(b) by 548 days.

(21) Appl. No.: 14/593,512

(22) Filed: Jan. 9, 2015

(65) Prior Publication Data

US 2015/0211418 A1  Jul. 30, 2015

(30) Foreign Application Priority Data

Jan. 30, 2014  (GB) .................................. 1401581.2

(51) Int. Cl.
 *F02C 7/22* (2006.01)
 *F16L 9/19* (2006.01)

(52) U.S. Cl.
 CPC ............... *F02C 7/222* (2013.01); *F16L 9/19* (2013.01); *F05D 2220/32* (2013.01); *F05D 2230/22* (2013.01); *F05D 2230/30* (2013.01); *F05D 2230/53* (2013.01); *F05D 2250/311* (2013.01); *F05D 2250/36* (2013.01); *F05D 2260/95* (2013.01)

(58) Field of Classification Search
 CPC .............. F02C 7/222; F16L 9/19; F16L 11/22
 See application file for complete search history.

(56) References Cited

U.S. PATENT DOCUMENTS

| 3,283,502 A | 11/1966 | Lefebvre |
| 3,516,252 A | 6/1970 | Udell et al. |
| 4,467,610 A | 8/1984 | Pearson et al. |

(Continued)

FOREIGN PATENT DOCUMENTS

| EP | 1 719 950 A2 | 11/2006 |
| EP | 2 434 129 A2 | 3/2012 |

(Continued)

OTHER PUBLICATIONS

Jun. 23, 2015 Search Report issued in European Patent Application No. 15150591.4.

(Continued)

*Primary Examiner* — Arun Goyal
(74) *Attorney, Agent, or Firm* — Oliff PLC

(57) ABSTRACT

A fuel manifold and fuel injector arrangement has a fuel manifold and at least one fuel injector. The fuel injector has main and pilot fuel nozzles. The fuel manifold has at least one fuel pipe segment and each fuel pipe segment has an outer pipe, an intermediate pipe arranged within the outer pipe and an inner pipe arranged within the intermediate pipe. A thermally insulating medium is provided in a chamber defined between the outer pipe and the intermediate pipe. The chamber between the intermediate pipe and the inner pipe is fluidly connected to a first fuel supply and the chamber within the inner pipe is fluidly connected to a second fuel supply. The at least one pilot fuel nozzle is fluidly connected to the chamber between the intermediate pipe and the inner pipe and the main fuel nozzle is fluidly connected to the chamber within the inner pipe.

20 Claims, 6 Drawing Sheets

(56) References Cited

U.S. PATENT DOCUMENTS

| | | | |
|---|---|---|---|
| 4,854,127 A * | 8/1989 | Vinson | F23C 7/002 |
| | | | 239/424.5 |
| 4,862,693 A | 9/1989 | Batakis et al. | |
| 5,197,288 A | 3/1993 | Newland et al. | |
| 5,211,005 A | 5/1993 | Hovnanian | |
| 5,220,795 A * | 6/1993 | Dodds | F23R 3/04 |
| | | | 60/747 |
| 6,457,316 B1 | 10/2002 | Czachor et al. | |
| 6,711,898 B2 | 3/2004 | Laing et al. | |
| 7,992,390 B2 | 8/2011 | Patel et al. | |
| 8,037,690 B2 | 10/2011 | Morenko et al. | |
| 8,079,220 B2 | 12/2011 | Haggerty | |
| 8,156,746 B2 | 4/2012 | Buelow et al. | |
| 8,205,643 B2 * | 6/2012 | Lee | F16L 9/18 |
| | | | 138/109 |
| 8,297,057 B2 | 10/2012 | Toon | |
| 8,365,531 B2 | 2/2013 | Pidcock et al. | |
| 8,443,608 B2 * | 5/2013 | Williams | F02C 7/222 |
| | | | 60/740 |
| 8,661,825 B2 * | 3/2014 | Desai | F23R 3/283 |
| | | | 60/737 |
| 9,404,657 B2 * | 8/2016 | Burd | F23R 3/346 |
| 2011/0154824 A1 | 6/2011 | Fiebig et al. | |
| 2012/0145273 A1 | 6/2012 | Pelletier et al. | |
| 2012/0151927 A1 | 6/2012 | Desai et al. | |
| 2013/0247574 A1 | 9/2013 | Patel et al. | |

FOREIGN PATENT DOCUMENTS

| | | |
|---|---|---|
| EP | 2 615 372 A2 | 7/2013 |
| GB | 889308 | 2/1962 |
| GB | 2 080 474 A | 2/1982 |
| GB | 2 440 546 A | 2/2008 |
| GB | 2 456 147 A | 7/2009 |
| GB | 2462915 A | 3/2010 |
| WO | WO 2008/071902 A1 | 6/2008 |

OTHER PUBLICATIONS

Aug. 14, 2014 Search Report issued in British Patent Application No. 1401581.2.

* cited by examiner

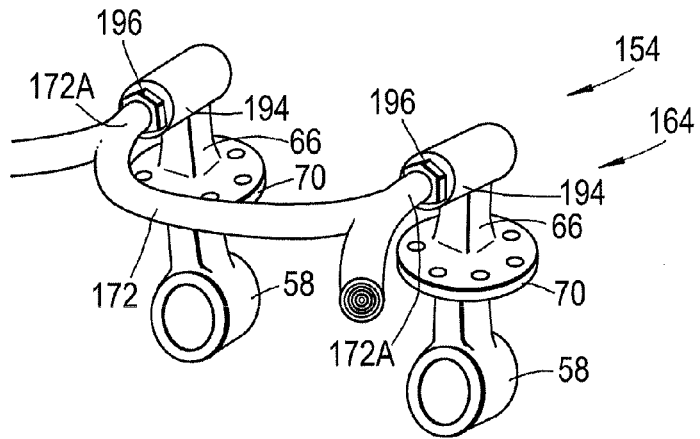
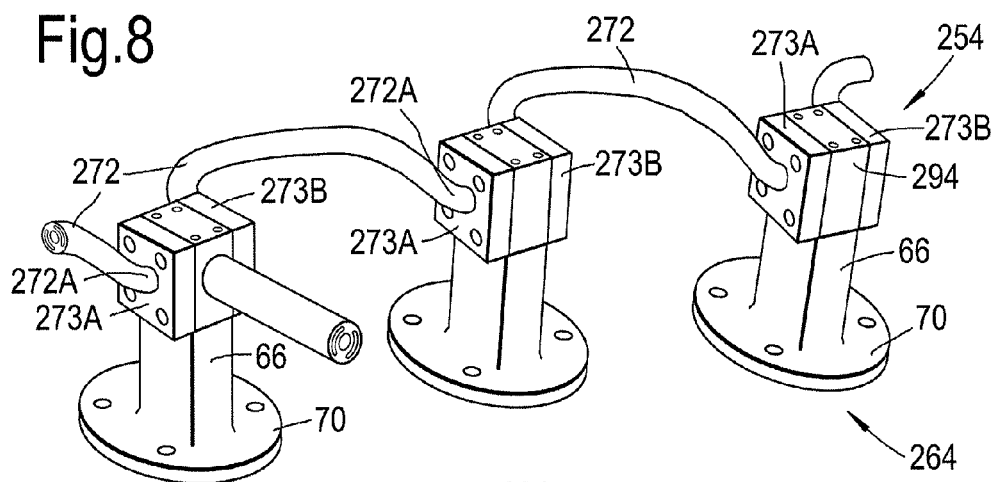
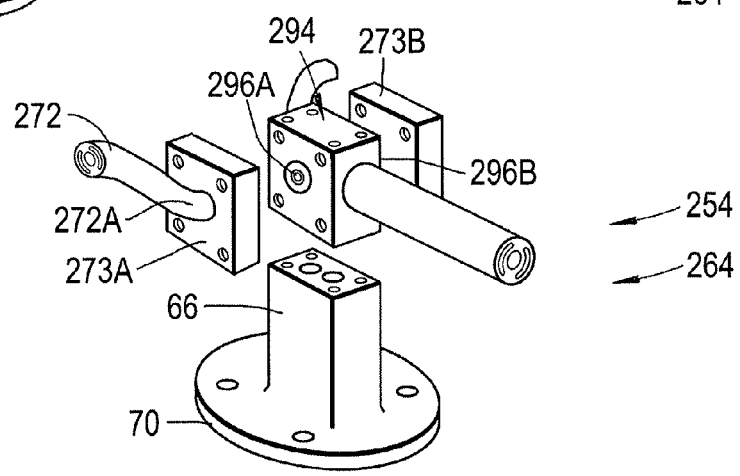

FUEL MANIFOLD AND FUEL INJECTOR ARRANGEMENT

FIELD OF THE INVENTION

The present disclosure relates to a fuel manifold and a fuel injector arrangement and in particular relates to a fuel manifold and fuel injector arrangement for a gas turbine engine.

BACKGROUND TO THE INVENTION

Currently most gas turbine engine combustion chambers operate using fuel injectors to provide rich burn. These combustion chambers have a single supply of fuel through a fuel manifold and fuel injector arrangement in which pigtails supply fuel from the fuel manifold to the fuel nozzle of each fuel injector. The pigtails are curved pipes which are subject to thermal and mechanical displacement which may lead to stresses within the curved pipes of the pigtails.

Some gas turbine engine combustion chambers operate using fuel injectors to provide lean burn. These combustion chambers have a plurality of, two, supplies of fuel to a pilot fuel nozzle and a main fuel nozzle of each fuel injector. At low power conditions the main fuel nozzles of the fuel injectors are not supplied with fuel and this leads to stagnation of the main fuel within the associated main fuel manifold and main fuel pipework for the main fuel. A problem with this is that heat may be conducted from the surroundings through the main fuel manifold and main fuel pipework and into the main fuel and this may lead to fuel breakdown, carbon formation and possibly fuel manifold/main fuel pipework blockage or shedding of carbon particles from the main manifold/main pipework into the fuel injector and/or main fuel nozzle and possibly blockage of the fuel injector and/or main fuel nozzle.

Therefore the present disclosure seeks to provide a novel fuel manifold and fuel injector arrangement which reduces or overcomes the above mentioned problem.

STATEMENTS OF INVENTION

Accordingly the present disclosure provides a fuel manifold and fuel injector arrangement comprising a fuel manifold and at least one fuel injector,
the at least one fuel injector comprising a first fuel nozzle and a second fuel nozzle,
the fuel manifold comprising at least one fuel pipe segment, each fuel pipe segment comprising an outer pipe, an intermediate pipe arranged within the outer pipe and an inner pipe arranged within the intermediate pipe, a vacuum or a thermally insulating medium being provided in a chamber defined between the outer pipe and the intermediate pipe,
the chamber between the intermediate pipe and the inner pipe being fluidly connected to a second fuel supply, the chamber within the inner pipe being fluidly connected to a first fuel supply, and
the second fuel nozzle being fluidly connected to the chamber between the intermediate pipe and the inner pipe and the first fuel nozzle being fluidly connected to the chamber within the inner pipe.

Preferably the intermediate pipe is arranged concentrically within the outer pipe and the inner pipe is arranged concentrically within the intermediate pipe.

Preferably there are first interconnecting structures connecting the outer pipe and the intermediate pipe and second interconnecting structures connecting the intermediate pipe and the inner pipe.

Preferably the outer pipe, the intermediate pipe and the inner pipe comprise a metal. Preferably the metal comprises steel, a nickel alloy, a cobalt alloy, a titanium alloy or other suitable alloy. Preferably the outer pipe, the intermediate pipe and the inner pipe are integrally formed, e.g. the outer pipe, the intermediate pipe and the inner pipe comprise a single piece. Preferably the outer pipe, the intermediate pipe and the inner pipe are formed by direct laser deposition (DLD), direct metal laser sintering (DMLS) or selective laser sintering (SLS) or other similar suitable processes.

Preferably the thermally insulating medium may comprise air or other suitable thermally insulating medium having a thermal conductivity value less than the thermal conductivity of the material of the fuel pipe segment.

The outer pipe may have a thermally insulating coating on its outer surface.

The fuel manifold and fuel injector arrangement may comprise a plurality of fuel injectors and a plurality of fuel pipe segments.

At least one fuel pipe segment may interconnect two fuel injectors and the at least one fuel pipe segment is arcuate.

Each fuel pipe segment may interconnect two adjacent fuel injectors or each fuel pipe segment may interconnect alternate fuel injectors.

Each arcuate pipe segment may curve substantially through 180° to form a C-shape or each arcuate pipe segment may have two straight sections connected by a curved section which curves substantially through 180° to form a U-shape.

Each end of each fuel pipe segment may be secured to a connector head of a fuel injector.

Each end of each fuel pipe segment may have a flange and the flange at the end of each fuel pipe segment is secured to the connector head of a fuel injector.

The connector head of the fuel injector may have two connectors, each end of each fuel pipe segment is secured to a respective connector on the connector head of a fuel injector and the connectors are on the same face of the connector head or on opposite faces of the connector head.

The inner pipe may be divided into two chambers. Each of the two chambers within the inner pipe of the fuel pipe segment may be fluidly connected to the first fuel supply. The second fuel nozzle of each fuel injector may be fluidly connected to a second chamber of a fuel pipe segment, the first fuel nozzles of a plurality of the fuel injectors are fluidly connected to a first chamber within the inner pipe of the fuel pipe segment and the first fuel nozzles of a plurality of the fuel injectors are fluidly connected to a second chamber within the inner pipe of the fuel pipe segment.

The first fuel nozzle may be a main fuel nozzle and the second fuel nozzle is a pilot fuel nozzle.

The at least one fuel injector may be a lean burn fuel injector. The pilot fuel nozzle and the main fuel nozzle may be pre-filming fuel nozzles.

BRIEF DESCRIPTION OF THE DRAWINGS

The present disclosure will be more fully described by way of example with reference to the accompanying drawings, in which:

FIG. 7 is an enlarged perspective view of a portion of a further fuel manifold and fuel injector arrangement according to the present disclosure.

FIG. 8 is an enlarged perspective view of a portion of another fuel manifold and fuel injector arrangement according to the present disclosure.

FIG. 9 is an exploded perspective view of the fuel manifold and fuel injector arrangement shown in FIG. 8.

DETAILED DESCRIPTION

Figure 1:
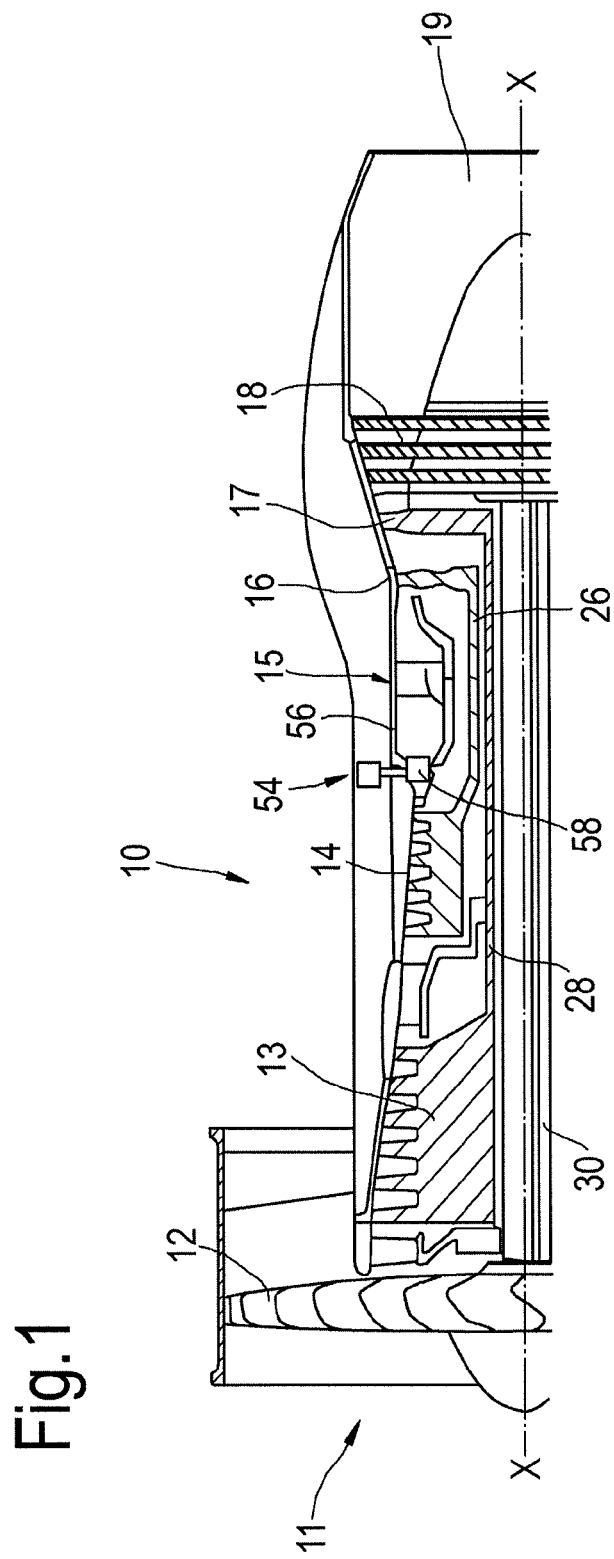
FIG. 1 is partially cut away view of a turbofan gas turbine engine having a fuel manifold and fuel injector arrangement according to the present disclosure.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
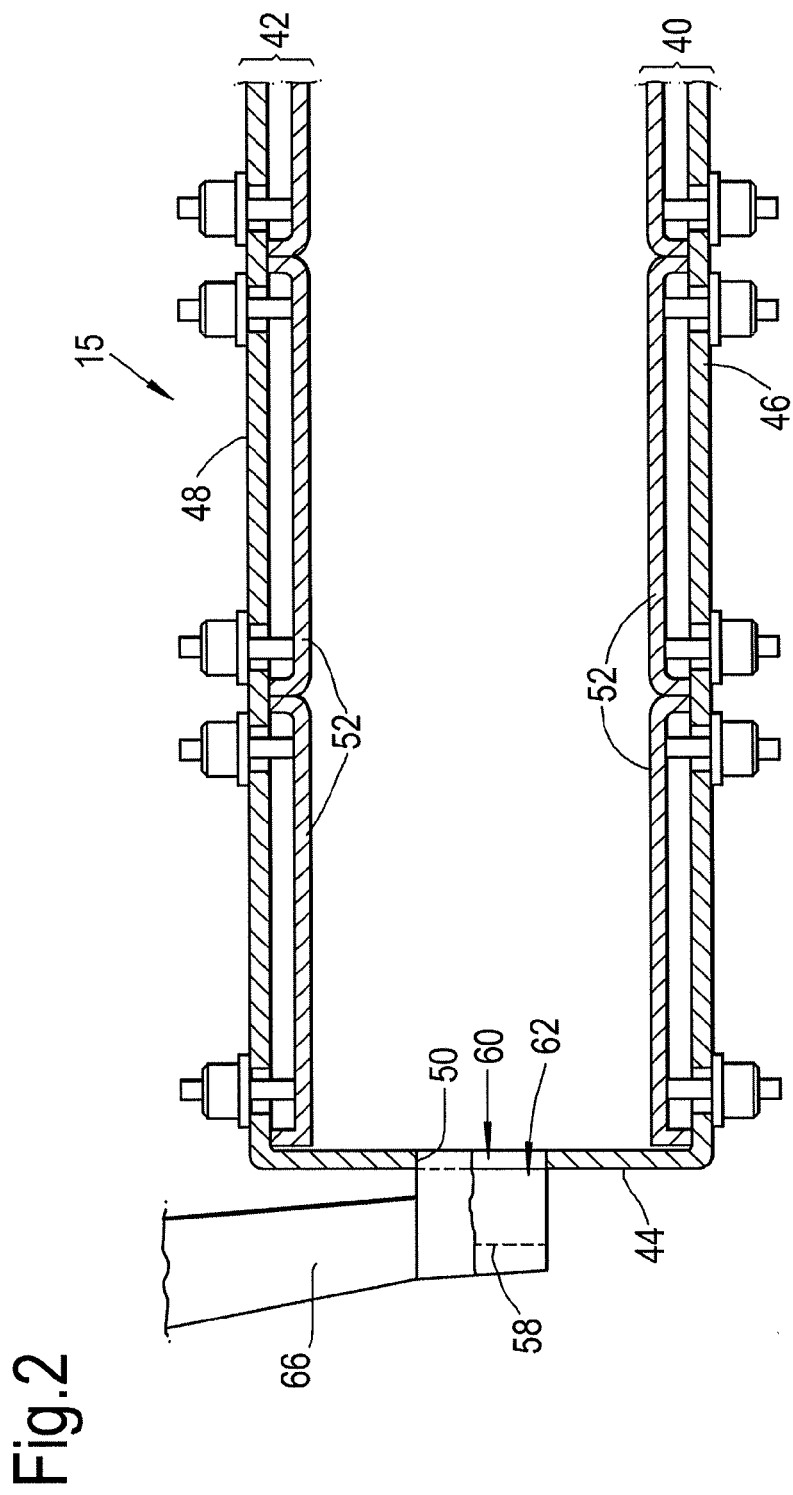
FIG. 2 is an enlarged cross-sectional view through the combustion chamber shown in FIG. 1.

The combustion chamber 15, as shown more clearly in FIG. 2, is an annular combustion chamber and comprises a radially inner annular wall structure 40, a radially outer annular wall structure 42 and an upstream end wall structure 44. The radially inner annular wall structure 40 comprises a first annular wall 46. The radially outer annular wall structure 42 comprises a second annular wall 48. The upstream end of the first annular wall 46 is secured to the upstream end wall structure 44 and the upstream end of the second annular wall 48 is secured to the upstream end wall structure 44. In this example the radially inner annular wall structure 40 also comprises a number of tiles 52 secured to the first annular wall 46 and the radially outer annular wall structure 42 also comprises a number of tiles 52 secured to the second annular wall 48. The upstream end wall structure 44 has a plurality of circumferentially spaced apertures 50 and each aperture 50 has a respective one of a plurality of fuel injectors 58 located therein. The fuel injectors 58 are arranged to supply fuel into the annular combustion chamber 15 during operation of the gas turbine engine 10.

Each fuel injector 58 is a lean burn fuel injector and has a pilot fuel nozzle 60 and a main fuel nozzle 62. The lean burn fuel injector may for example be the same as that described in our published patent applications GB2456147A, EP1719950A2 or WO2008071902A1. The pilot fuel nozzle 60 of each fuel injector 58 is supplied continuously with pilot fuel during operation of the turbofan gas turbine engine 10 but the main fuel nozzle 62 of each fuel injector 58 is only supplied with main fuel when the turbofan gas turbine engine 10 is operating at or above a predetermined power setting. The pilot fuel nozzle 60 and the main fuel nozzle 62 of each fuel injector 58 are supplied with fuel from a pilot fuel supply and a main fuel supply respectively via a fuel manifold 64. Both the fuel flow rate of the pilot fuel and the fuel flow rate of the main fuel are separately controlled and depend upon the operating condition of the turbofan gas turbine engine 10. The pilot fuel nozzle 60 is arranged concentrically within the main fuel nozzle 62 and the pilot fuel nozzle 60 and the main fuel nozzle 62 comprise pre-filming fuel nozzles.

A fuel manifold and fuel injector arrangement 54 for a combustion chamber 15 according to the present disclosure is shown more clearly in FIGS. 3 to 6. The combustion chamber 15 is an annular combustion chamber and an annular combustion chamber casing 56 is arranged generally coaxially around the annular combustion chamber 15 and coaxially with the axis X-X of the turbofan gas turbine engine 10. The annular combustion chamber casing 56 has a flange 55 at an upstream end and a flange 57 at a downstream end which are fastened to an adjacent compressor casing (not shown) and an adjacent turbine casing (not shown) respectively via suitable fasteners, e.g. nuts, bolts and washers. A plurality of circumferentially spaced fuel injectors 58 are arranged to supply fuel into the annular combustion chamber 15 and a fuel manifold 64 is arranged to supply fuel to each of the fuel injectors 58. Each fuel injector 58 has a fuel feed arm 66 extending through a corresponding one of a plurality of circumferentially spaced apertures 68 in the annular combustion chamber casing 56. Each fuel feed arm 66 has an associated sealing plate, or flange, 70 which is secured onto the annular combustion chamber casing 56 by suitable fasteners, e.g. bolts. The fuel injectors 58 and apertures 68 are equi-circumferentially spaced around the annular combustion chamber casing 56.

The fuel manifold and fuel injector arrangement 54 for the combustion chamber 15 comprises a fuel manifold 64 and at least one fuel injector 58. The at least one fuel injector 58 as previously mentioned comprises a main fuel nozzle 60 and a pilot fuel nozzle 62. The fuel manifold 64 comprises at least one fuel pipe segment 72 and each fuel pipe segment 72 comprises an outer pipe 74, an intermediate pipe 76 arranged within the outer pipe 74 and an inner pipe 78 arranged within the intermediate pipe 76, as shown more clearly in FIG. 4. A thermally insulating medium 84, for example air or other suitable thermally insulating medium having a thermal conductivity value less than the thermal conductivity of the material of the fuel pipe segment 72, is provided within a chamber 82 defined between the outer pipe 74 and the intermediate pipe 76. A chamber 86 between the intermediate pipe 76 and the inner pipe 78 is fluidly connected to a first fuel supply and a chamber 88 within the inner pipe 78 is fluidly connected to a second fuel supply. The at least one pilot fuel nozzle 60 is fluidly connected to the chamber 84 between the intermediate pipe 76 and the inner pipe 78 and the main fuel nozzle 62 is fluidly connected to the chamber 86 within the inner pipe 78.

In this arrangement the intermediate pipe 76 is arranged concentrically within the outer pipe 74 and the inner pipe 78 is arranged concentrically within the intermediate pipe 76. It is to be noted that there are first interconnecting structures 75 connecting the outer pipe 74 and the intermediate pipe 76 and second interconnecting structures 77 connecting the intermediate pipe 76 and the inner pipe 78. The first interconnecting structures 75 are spaced apart circumferentially between the outer pipe 74 and the intermediate pipe 76 and the second interconnecting structures 77 are spaced apart circumferentially between the intermediate pipe 76 and the inner pipe 78. There may be a plurality of first interconnecting structures 75 and a plurality of second interconnecting structures 77 and each first interconnecting structure 75 extends continuously longitudinally along the length of the fuel pipe segment 70 and each second interconnecting structure 77 extends continuously longitudinally along the length of the fuel pipe segment 70. Alternatively there may be a plurality of first interconnecting structures 75 and a plurality of second interconnecting structures 77 and the first interconnecting structures 75 are spaced apart longitudinally along the length of the fuel pipe segment 70 and the second interconnecting structures 77 are spaced apart longitudinally along the length of the fuel pipe segment 70. This arrangement has four first interconnecting structures 75 spaced 90° apart, four second interconnecting structures 77 spaced 90° apart and the first interconnecting structures 75 and the second interconnecting structures 77 are spaced 45° apart.

The outer pipe 74, the intermediate pipe 76 and the inner pipe 78 comprise a metal and the metal comprises steel, a nickel alloy, a cobalt alloy, a titanium alloy or other suitable alloy. The outer pipe 74, the intermediate pipe 76 and the inner pipe 78 are integrally formed, e.g. the outer pipe 74, the intermediate pipe 76 and the inner pipe 78 comprise a single piece and the first interconnecting structures 75 and the second interconnecting structures 77 are integral with the outer pipe 74, the intermediate pipe 76 and the inner pipe 78 to enable them to manufactured as a single piece and thus the fuel pipe segment 72 is a single piece. Preferably the outer pipe 74, the intermediate pipe 76 and the inner pipe 78 are formed by direct laser deposition (DLD), direct metal laser sintering (DMLS) or selective laser sintering (SLS) or other similar suitable processes using for example microwave or electron beams to sinter the metal. It is to be noted that the fuel pipe segments 72 are generally rigid because they are manufactured from metal and due to their construction comprising three concentric pipes 74, 76 and 78 and the interconnecting structures 75 and 77.

The first and second interconnecting structures 75 and 77, as mentioned above, enable the fuel pipe segment 72 to be manufactured as a single piece and also they space the outer pipe 74 from the intermediate pipe 76 and space the intermediate pipe 76 from the inner pipe 78 to define the radial dimensions of the chambers 82 and 86 respectively.

The outer pipe 74 may have a thermally insulating coating 92 on its outer surface 90 to provide further thermal insulation for the fuel within the fuel pipe segment 72 of the fuel manifold 64, especially for the main fuel within the chamber 88 in the inner pipe 78 of the fuel pipe segment 72.

Figure 3:
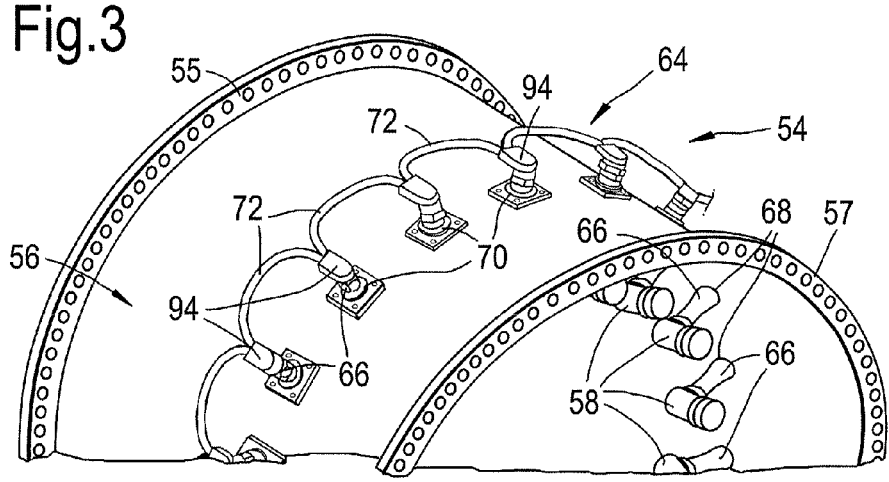
FIG. 3 is an enlarged perspective view of a portion of a fuel manifold and fuel injector arrangement according to the present disclosure.
Figure 6:
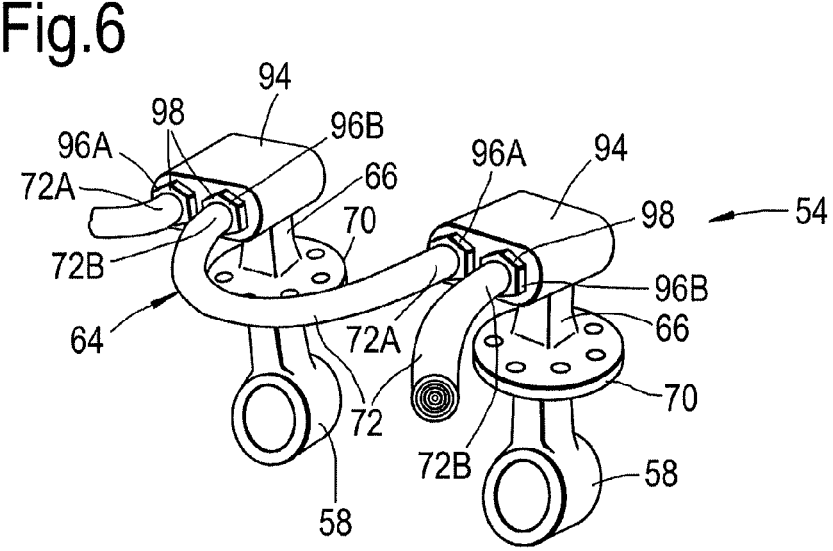
FIG. 6 is a further enlarged perspective view of a portion of a fuel manifold and fuel injector arrangement according to the present disclosure.

In this arrangement the fuel manifold and fuel injector arrangement 54 comprises a plurality of fuel injectors 58 and a plurality of fuel pipe segments 72. Each fuel feed arm 66 of each fuel injector 58 has a connector head 94 at its radially outer end. Each connector head 94 has two connectors 96A and 96B arranged generally parallel with the axis X-X of the turbofan gas turbine engine 10 and thus the connectors 96A and 96B face either in an upstream direction, as shown in FIG. 3, or in a downstream direction (not shown). The two connectors 96A and 96B are spaced generally circumferentially, as shown in FIG. 6, but they may be spaced radially or they may be spaced radially and circumferentially. Each fuel pipe segment 72 is arcuate and a first end 72A of each fuel pipe segment 72 locates in/on a connector 96A of a connector head 94 of one fuel feed arm 66 and a second end 72B of each fuel pipe segment 72 locates in/on a connector 96B of a connector head 94 of a circumferentially adjacent fuel feed arm 66, as shown in FIG. 6. The length of the arcuate fuel pipe segments 72 are made sufficiently long to provide some flexibility to enable the fuel manifold 54 to cope with build tolerances and differential thermal expansion etc. Each connector head 94 supplies fuel, both the primary fuel and the pilot fuel, from one fuel pipe segment 72 to the adjacent fuel pipe segment 72 and supplies fuel, both the primary fuel and the pilot fuel, to the associated fuel injector 58.

Figure 5:
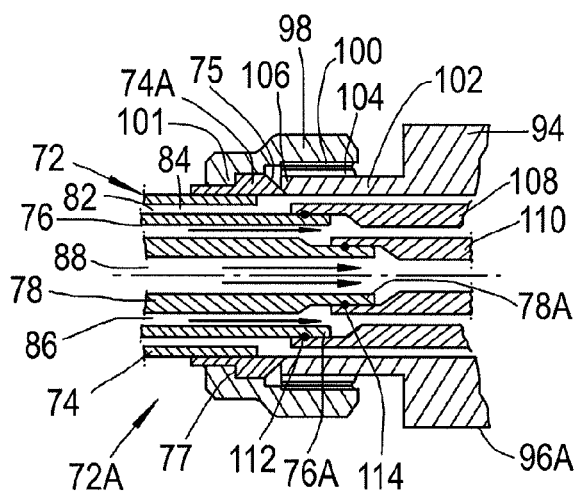
FIG. 5 is an enlarged cross-sectional view of a connector between a fuel manifold and a fuel injector according to the present disclosure.

FIG. 5 shows a first end 72A of a fuel pipe segment 72 and a connector 96A of a connector head 94 in more detail. The connector 96A comprises an outer tube 102 extending from the connector head 94, the outer surface of the outer tube 102 has an external thread 104 and the end of the outer tube 102 has a conical surface 106. An intermediate tube 108 is arranged within the outer tube 102 and an inner tube 110 is arranged within the intermediate tube 108. A nut 98 is provided to clamp the first end 72A of the fuel pipe segment 72 onto the connector 96A. The outer pipe 74 is provided with a stepped portion 77 on an outer surface at the first end 74A of the outer pipe 74. The nut 98 has an internal thread 100 so that it cooperates with the external thread 104 on the outer surface of the outer tube 102 of the connector 96A and has an internal flange 101 to abut the stepped portion 77 of the first end 74A of the outer pipe 74 to clamp the first end 72A of the fuel pipe segment 72 onto the connector 96A. The end 74A of the outer pipe 74 has a conical surface 75 which is arranged to match and abut the conical surface 106 of the outer tube 102 of the connector 96A to form a seal therebetween. The first end 76A of the intermediate pipe 76 is arranged to locate coaxially within the intermediate tube 108 of the connector 96A and an O-ring seal 112 is provided there-between to form a seal. The first end 78A of the inner pipe 78 is arranged to locate coaxially within the inner tube 110 of the connector 96A and an O-ring seal 114 is provided there-between to form a seal. A second end 72B of a fuel pipe segment 72 and a connector 96B of a connector head 94 are arranged substantially the same as a first end 72A of a fuel pipe segment 72 and a connector 96A of a connector head 94. The 0-ring seals 112 and 114 may comprise suitable polymeric O-ring seals.

In another arrangement the fuel manifold and fuel injector arrangement 154 comprises a fuel manifold 164 and a plurality of fuel injectors 58 and the fuel manifold 164 comprises a single continuous fuel pipe segment 172. Each fuel feed arm 66 of each fuel injector 58 has a connector head 194 at its radially outer end. Each connector head 194 has a single connector 196 arranged generally parallel with the axis X-X of the turbofan gas turbine engine 10 and thus faces either in an upstream direction, as shown in FIG. 7, or in a downstream direction (not shown). The fuel pipe segment 172 comprises a plurality of arcuate sections and at the junction of two adjacent arcuate sections a connector 172A locates in/on a connector 196 of a connector head 194 of one fuel feed arm 66. The connector 172A and connector 196 are substantially the same as the end 72A and connector 96 shown in FIG. 5. The length of the arcuate sections of the fuel pipe segment 172 are made sufficiently long to provide some flexibility to enable the fuel manifold 154 to cope with build tolerances and differential thermal expansion etc. Each connector head 194 supplies fuel, both the primary fuel and the pilot fuel, from one arcuate section of the fuel pipe segment 172 to the adjacent arcuate section of the fuel pipe segment 172 and supplies fuel, both the primary fuel and the pilot fuel, to the associated fuel injector 58.

Another fuel manifold and fuel injector arrangement 254 is shown in FIGS. 8 and 9. In this arrangement the fuel manifold and fuel injector arrangement 254 comprises a fuel manifold 264 and a plurality of fuel injectors 58 and the fuel manifold 264 comprises a plurality of fuel pipe segments 272. Each fuel feed arm 66 of each fuel injector 58 has a connector head 294 at its radially outer end. Each connector head 294 has two connectors 296A and 296B arranged generally tangential to a circle around the axis of the turbofan gas turbine engine 10 and thus facing in opposite circumferential directions, as shown in FIGS. 8 and 9. The connectors 296A and 296B of each connector head 294 are arranged in two parallel flat surfaces of the connector head 294. Each fuel pipe segment 272 is arcuate and a first end 272A of each fuel pipe segment 272 locates in/on a connector 296A of a connector head 294 of one fuel feed arm 66 and a second end 272B of each fuel pipe segment 272 locates in/on a connector 296B of a connector head 294 of a circumferentially adjacent fuel feed arm 66. In this arrangement the first end 272A of each fuel pipe segment 272 has an integral flange 273A and the second end 272B of each fuel pipe segment 272 has an integral flange 273B. The integral flanges 273A and 273B of each fuel pipe segment 272 are secured against the fat surfaces of the connector heads 294 of two circumferentially adjacent fuel injectors 58 by suitable fasteners, e.g. bolts. Each connector head 294 is separate from the fuel feed arm 66 of the associated fuel injector 58 and is secured thereto by suitable fasteners, e.g. bolts. The connectors 272A and 272B and connectors 296A and 296B are substantially the same as the end 72A and connector 96 shown in FIG. 5, but differ in that the flanges 273A and 273B are used to fasten the first and second ends 272A and 272B of each fuel pipe segment 272 to the connector heads 294 instead of a stepped portion 77 on an outer surface at the first end 74A of the outer pipe 74, the nut 98 and the external thread 104 on the outer surface of the outer tube 102 of the connector 96A.

The length of the arcuate fuel pipe segments 272 are made sufficiently long to provide some flexibility to enable the fuel manifold 254 to cope with build tolerances and differential thermal expansion etc. Each connector head 294 supplies fuel, both the primary fuel and the pilot fuel, from one fuel pipe segment 272 to the adjacent fuel pipe segment 272 and supplies fuel, both the primary fuel and the pilot fuel, to the associated fuel injector 58. In addition each connector head 294 allows tolerances between the arcuate fuel pipe segments 272 of the fuel manifold 264 and fuel injectors 58 to be accommodated by axial and lateral float between the flanges 273A and 273B and the flat surfaces of the connector head 294. During build a plurality of arcuate pipe segments 272 are bolted to an appropriate number of connector heads 294 to form a fuel manifold sub-assembly which may be tested for fuel leaks. After checking each fuel manifold sub-assembly is fitted onto the gas turbine engine 10 by bolting each connector head 294 to a respective one of the fuel feed arms 66. The connector heads 294 allow misalignment between the connector heads 294 and the fuel feed arms 66/fuel injector 58 whilst still providing a sealed flow of fuel from the connector heads 294 to the fuel feed arms 66 in order to compensate for build tolerances in the positions of the fuel injectors 58 within the combustion chamber casing 56.

Figure 10:
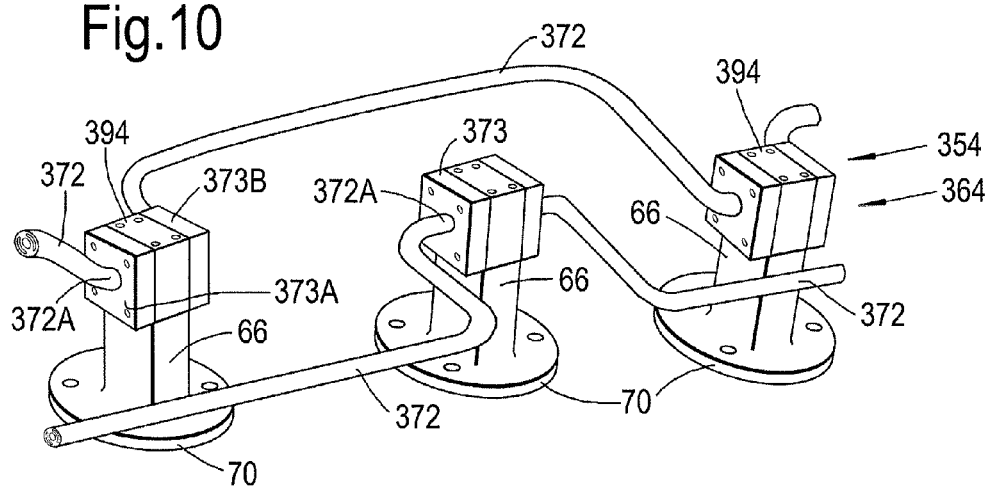
FIG. 10 is an enlarged perspective view of a portion of an alternative fuel manifold and fuel injector arrangement according to the present disclosure.

A further fuel manifold and fuel injector arrangement 354 is shown in FIG. 10. In this arrangement the fuel manifold and fuel injector arrangement 354 comprises a fuel manifold 364 and a plurality of fuel injectors 58 and the fuel manifold 364 comprises a plurality of fuel pipe segments 372. This arrangement is similar to the fuel manifold and fuel injector arrangement 254 shown in FIGS. 8 and 9. This arrangement differs in that each fuel pipe segment 372 connects circumferentially alternate fuel injectors 58 rather than circumferentially adjacent fuel injectors 58. This increases, approximately doubles, the length of the fuel pipe segments 372 between the fuel connectors 394 of the fuel injectors 58 and hence reduces build tolerance stresses and differential thermal stresses in the fuel pipe segments 372. This arrangement allows sector burning, e.g. alternate sector burning, to be achieved for a lean burn combustion chamber 15.

Figure 13:
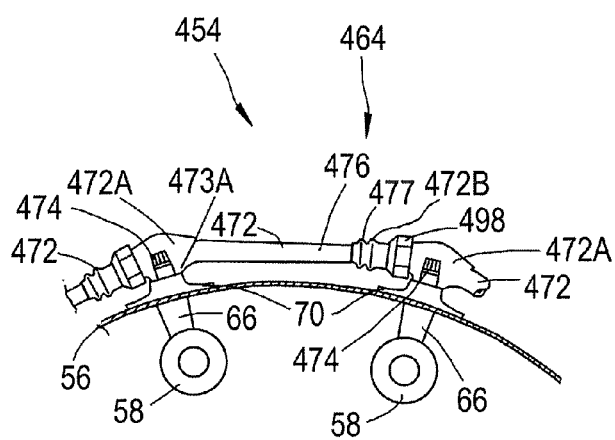
FIG. 13 is a view of a further fuel manifold and fuel injector arrangement according to the present disclosure.
Figure 14:
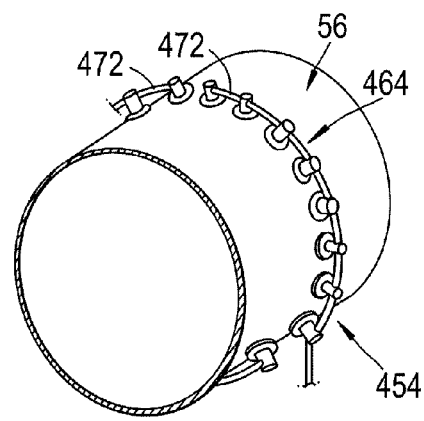
FIG. 14 is a perspective view of the fuel manifold and fuel injector arrangement shown in FIG. 13.
Figure 4:
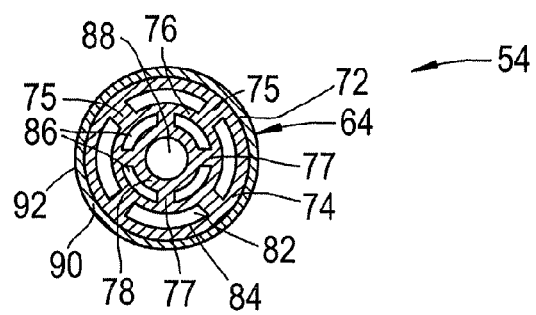
FIG. 4 is an enlarged cross-sectional view of a fuel manifold of the fuel manifold and fuel injector arrangement according to the present disclosure.

An additional fuel manifold and fuel injector arrangement 454 is shown in FIGS. 13 and 14. The fuel manifold and fuel injector arrangement 454 comprises a fuel manifold 464 and a plurality of fuel injectors 58 and the fuel manifold 464 comprises a plurality of fuel pipe segments 472. In this arrangement each fuel pipe segment 472 connects circumferentially adjacent fuel injectors 58 but the fuel pipe segments 472 are substantially straight, rather than arcuate as in the previous arrangements. The straight fuel pipe segments 472 are easier to manufacture by direct laser deposition (DLD), direct metal laser sintering (DMLS) or selective laser sintering (SLS). The straight fuel pipe segments 472 do not require supporting brackets. This arrangement has two fuel manifolds 454 and associated fuel injectors 58 for two halves of the turbofan gas turbine engine 10. Each fuel pipe segment 472 has a first end 472A and a second end 472B. The first end 472A of the fuel pipe segment 472 has an end cap 473A which is secured onto a flat radially outer end of the fuel feed arm 66 by bolts 474. The end cap 473A and flat radially outer end of the fuel feed arm have connectors (not shown) to supply the pilot fuel and main fuel into the fuel injector 58 and the connectors are substantially the same as those shown in FIG. 5. The end cap 473A also has a connector to connect the first end 472A of the fuel pipe segment 472 to a connector at the second end 472B of an adjacent fuel pipe segment 472. The outer pipe 476 at the second end 472B of the fuel pipe segment 472 has a bellows 477 and the bellows 477 is secured to the end cap 473A at the first end 472A of the adjacent fuel pipe segment 472 by a nut 498 in a similar manner to that shown in FIG. 5.

Figure 11:
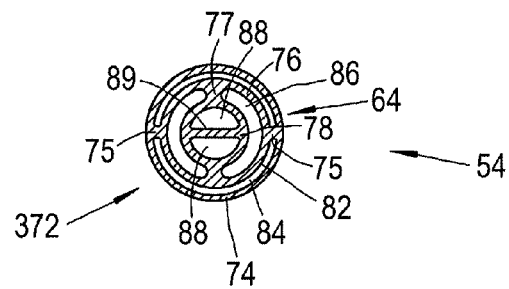
FIG. 11 is an enlarged cross-sectional view of the alternative fuel manifold of the fuel manifold and fuel injector arrangement shown in FIG. 10.

Another fuel manifold 64 comprises at least one fuel pipe segment 72 and each fuel pipe segment 72 comprises an outer pipe 74, an intermediate pipe 76 arranged within the outer pipe 74 and an inner pipe 78 arranged within the intermediate pipe 76, as shown more clearly in FIG. 11. A thermally insulating medium 84, for example air or other thermally insulating medium having a thermal conductivity value less than the thermal conductivity of the material of the fuel pipe segment 72, is provided within a chamber 82 defined between the outer pipe 74 and the intermediate pipe 76. A chamber 86 between the intermediate pipe 76 and the inner pipe 78 is fluidly connected to a first fuel supply and a chamber 88 within the inner pipe 78 is fluidly connected to a second fuel supply. The at least one pilot fuel nozzle 60 is fluidly connected to the chamber 84 between the intermediate pipe 76 and the inner pipe 78 and the main fuel nozzle 62 is fluidly connected to the chamber 86 within the inner pipe 78.

In the arrangement in FIG. 11 the intermediate pipe 76 is arranged concentrically within the outer pipe 74 and the inner pipe 78 is arranged concentrically within the intermediate pipe 76. It is to be noted that there are first interconnecting structures 75 connecting the outer pipe 74 and the intermediate pipe 76 and second interconnecting structures 77 connecting the intermediate pipe 76 and the inner pipe 78. The first interconnecting structures 75 are spaced apart circumferentially between the outer pipe 74 and the intermediate pipe 76 and the second interconnecting structures 77 are spaced apart circumferentially between the intermediate pipe 76 and the inner pipe 78. There may be a plurality of first interconnecting structures 75 and a plurality of second interconnecting structures 77 and each first interconnecting structure 75 extends continuously longitudinally along the length of the fuel pipe segment 70 and each second interconnecting structure 77 extends continuously longitudinally along the length of the fuel pipe segment 70. Alternatively there may be a plurality of first interconnecting structures 75 and a plurality of second interconnecting structures 77 and the first interconnecting structures 75 are spaced apart longitudinally along the length of the fuel pipe segment 70 and the second interconnecting structures 77 are spaced apart longitudinally along the length of the fuel pipe segment 70. This arrangement has two first interconnecting structures 75 spaced 180° apart, two second interconnecting structures 77 spaced 180° apart and the first interconnecting structures 75 and the second interconnecting structures 77 are spaced 90° apart. This arrangement does not have a thermally insulating coating on the outer surface of the outer pipe 74. In addition the inner pipe 78 is divided into two by an interconnecting member 89 to form two chambers 88 and 88'. This arrangement is used for supplying main fuel to the fuel injectors to allow sector burning to be achieved for a lean burn combustion chamber 15 in conjunction with the fuel manifold arrangement of FIGS. 8 and 9. In this arrangement the sector burning is alternate sector burning with half of the fuel connectors 294 and associated fuel feed arms 66 arranged to supply main fuel from the chamber 88 in the fuel pipe segments 272 to the main fuel nozzles 62 of the associated fuel injectors 58 and the other half of the fuel connectors 294 and associated fuel feed arms 66 arranged to supply main fuel from the chamber 88' in the fuel pipe segments 272 to the main fuel nozzles 62 of the associated fuel injectors 58. Thus alternate fuel connectors 294 and fuel feed arms 66 will supply main fuel from the same chamber 88, or 88', of the fuel pipe segments 272 but adjacent fuel connectors 294 and fuel feed arms 66 will supply main fuel from different chambers 88 and 88' of the fuel pipe segments 272. Thus, alternate fuel connectors 294 have an identical flow path for fuel from the chamber 88 or 88' of the associated fuel pipe segment 272 and adjacent fuel connectors 294 have a different flow path for fuel from the chamber 88 or 88' of the associated fuel pipe segment 272.

The outer pipe 74, the intermediate pipe 76 and the inner pipe 78 of the fuel pipe segment 72 shown in FIG. 11 comprise a metal and the metal comprises steel, a nickel alloy, a cobalt alloy, a titanium alloy or other suitable alloy. The outer pipe 74, the intermediate pipe 76 and the inner pipe 78 are integrally formed, e.g. the outer pipe 74, the intermediate pipe 76 and the inner pipe 78 comprise a single piece and the first interconnecting structures 75 and the second interconnecting structures 77 enable them to be manufactured as a single piece. Preferably the outer pipe 74, the intermediate pipe 76 and the inner pipe 78 are formed by direct laser deposition (DLD), direct metal laser sintering (DMLS) or selective laser sintering (SLS) or other similar suitable processes using for example microwave or electron beams to sinter the metal.

Figure 12:
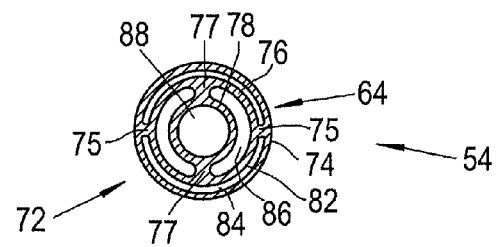
FIG. 12 is an alternative enlarged cross-sectional view of a fuel manifold of a fuel manifold and fuel injector arrangement according to the present disclosure.

In the arrangement in FIG. 12 the intermediate pipe 76 is arranged concentrically within the outer pipe 74 and the inner pipe 78 is arranged concentrically within the intermediate pipe 76. It is to be noted that there are first interconnecting structures 75 connecting the outer pipe 74 and the intermediate pipe 76 and second interconnecting structures 77 connecting the intermediate pipe 76 and the inner pipe 78. The first interconnecting structures 75 are spaced apart circumferentially between the outer pipe 74 and the intermediate pipe 76 and the second interconnecting structures 77 are spaced apart circumferentially between the intermediate pipe 76 and the inner pipe 78. There may be a plurality of first interconnecting structures 75 and a plurality of second interconnecting structures 77 and each first interconnecting structure 75 extends continuously longitudinally along the length of the fuel pipe segment 70 and each second interconnecting structure 77 extends continuously longitudinally along the length of the fuel pipe segment 70. Alternatively there may be a plurality of first interconnecting structures 75 and a plurality of second interconnecting structures 77 and the first interconnecting structures 75 are spaced apart longitudinally along the length of the fuel pipe segment 70 and the second interconnecting structures 77 are spaced apart longitudinally along the length of the fuel pipe segment 70. This arrangement has two first interconnecting structures 75 spaced 180° apart, two second interconnecting structures 77 spaced 180° apart and the first interconnecting structures 75 and the second interconnecting structures 77 are spaced 90° apart. This arrangement does not have a thermally insulating coating on the outer surface of the outer pipe 74.

The outer pipe 74, the intermediate pipe 76 and the inner pipe 78 of the fuel pipe segment 72 shown in FIG. 12 comprise a metal and the metal comprises steel, a nickel alloy, a cobalt alloy, a titanium alloy or other suitable alloy. The outer pipe 74, the intermediate pipe 76 and the inner pipe 78 are integrally formed, e.g. the outer pipe 74, the intermediate pipe 76 and the inner pipe 78 comprise a single piece and the first interconnecting structures 75 and the second interconnecting structures 77 enable them to be manufactured as a single piece. Preferably the outer pipe 74, the intermediate pipe 76 and the inner pipe 78 are formed by direct laser deposition (DLD), direct metal laser sintering (DMLS) or selective laser sintering (SLS) or other similar suitable processes using for example microwave or electron beams to sinter the metal.

In FIGS. 3, 6 and 8 of the fuel manifold and fuel injector arrangements described above each arcuate pipe segment may curve substantially through 180° to form a C-shape or half circle or each arcuate pipe segment may have two straight sections connected by a curved section which curves substantially through 180° to form a U-shape. In FIG. 7 of the fuel manifold and fuel injector arrangements described above the fuel manifold comprises a number of arcuate pipe segments joined to each other and each arcuate pipe segment may curve substantially through 180° to form a C-shape or half circle or each arcuate pipe segment may have two straight sections connected by a curved section which curves substantially through 180° to form a U-shape. In FIG. 10 of the fuel manifold and fuel injector arrangements described above each arcuate pipe segment may curve substantially through 90°, then have a straight section and then have a curve substantially through 90°. In FIGS. 13 and 14 of the fuel manifold and fuel injector arrangement described above each pipe segment is substantially straight.

The connectors are on the same face of the connector head as in FIGS. 3 and 6 or on opposite faces of the connector head as in FIGS. 8 and 10.

Although the present disclosure has been described with reference to a thermally insulating medium being provided in the chamber defined between the outer pipe and the intermediate pipe it may also be possible to provide a vacuum in the chamber defined between the outer pipe and the intermediate pipe in any of the embodiments described.

Although the present disclosure has been described with reference to an annular combustion chamber, the present disclosure is also applicable to a combustion chamber arrangement comprising a plurality of circumferentially spaced tubular combustion chambers arranged in a tubo-annular arrangement or to a plurality of separate circumferentially spaced tubular combustion chambers arranged in an annulus. The fuel manifold and fuel injector arrangement is for supplying fuel to at least one combustion chamber comprising an annular combustion chamber casing arranged around the at least one combustion chamber.

Although the present disclosure has been described with reference to lean burn fuel injectors having a main fuel nozzle and a pilot fuel nozzle it is equally applicable to multiple feed rich burn fuel injectors having a main fuel nozzle and a pilot fuel nozzle in which case the pilot fuel nozzle is fluidly connected to the chamber between the intermediate pipe and the inner pipe and the main fuel nozzle is fluidly connected to the chamber within the inner pipe.

Although the present disclosure has been described with reference to a turbofan gas turbine engine it is equally applicable to a turbojet gas turbine engine, a turbo-shaft gas turbine engine or a turboprop gas turbine engine and to an aero gas turbine engine, a marine gas turbine engine, an industrial gas turbine engine or an automotive gas turbine engine.

Although the present disclosure has been described with reference to a gas turbine engine combustion chamber it may be applicable to other combustion chambers.

An advantage of the present disclosure is that it provides a fuel pipe segment and a fuel manifold which has two fuel flow paths and arranges the fuel pipe segment and fuel manifold such that the potential for fuel stagnation and for fuel coking within the fuel pipe segment and fuel manifold is reduced. The present disclosure arranges the main fuel flow path such that it is surrounded by the pilot fuel flow path. This ensures that when the main fuel flow is stopped and the main fuel stagnates within the main fuel flow path, the continuous supply of pilot fuel through the pilot fuel flow path around the main fuel flow path reduces, or prevents, high convective heat transfer to the main fuel in the main fuel flow path. In addition a layer of thermally insulating medium is provided around the pilot fuel flow path to further reduce, or prevent, heat transfer to the pilot fuel and the main fuel. The layer of thermally insulating medium serves to prevent fuel leakage if there is a leak from the pilot and/or main fuel flow paths. The main fuel flow path is defined by an inner pipe, the pilot fuel flow path is defined between the inner pipe and an intermediate pipe and the thermally insulating medium is provided between the intermediate pipe and an outer pipe. The present disclosure also provides a fuel pipe segment and a fuel manifold where no additional pipework is required. The thicknesses of each of the outer pipe, the intermediate pipe and the inner pipe may be uniform along their respective lengths. Alternatively the thickness of each of the outer pipe, the intermediate pipe and the inner pipe may be non-uniform along their length to adjust the vibrational response characteristics of the fuel pipe segments.

The invention claimed is:

1. A fuel manifold and fuel injector arrangement for supplying fuel into a combustion chamber, the combustion chamber having a casing, the fuel manifold and fuel injector arrangement comprising at least one fuel manifold and at least one fuel injector wherein the at least one fuel manifold is connected to the at least one fuel in injector,
   the at least one fuel injector comprising a first fuel nozzle and a second fuel nozzle, the first fuel nozzle and the second fuel nozzle positioned radially inward of the casing,
   the at least one fuel manifold positioned radially outward of the casing, the at least one fuel manifold comprising at least one fuel pipe segment, each of the at least one fuel pipe segment comprising an outer pipe, an intermediate pipe arranged within the outer pipe, an inner pipe arranged within the intermediate pipe, first interconnecting structures connecting the outer pipe and the intermediate pipe, second interconnecting structures connecting the intermediate pipe and the inner pipe, and the outer pipe, the intermediate pipe and the inner pipe comprise a single piece,
   a first chamber being defined between the outer pipe and the intermediate pipe, a vacuum or a thermally insulating medium being provided in the first chamber,
   a second chamber being defined between the intermediate pipe and the inner pipe, the second chamber being fluidly connected to a second fuel supply,
   a third chamber being defined within the inner pipe, the third chamber being fluidly connected to a first fuel supply, and
   the second fuel nozzle being fluidly connected to the second chamber of the at least one fuel pipe segment of the at least one fuel manifold and the first fuel nozzle being fluidly connected to the third chamber of the at least one fuel pipe segment of the at least one fuel manifold.

2. A fuel manifold and fuel injector arrangement as claimed in claim 1 wherein the intermediate pipe is arranged concentrically within the outer pipe and the inner pipe is arranged concentrically within the intermediate pipe.

3. A fuel manifold and fuel injector arrangement as claimed in claim 1 wherein the outer pipe, the intermediate pipe and the inner pipe comprise a metal.

4. A fuel manifold and fuel injector arrangement as claimed in claim 3 wherein the metal is selected from a group consisting of steel, a nickel alloy, a cobalt alloy, a titanium alloy and another suitable alloy.

5. A fuel manifold and fuel injector arrangement as claimed in claim 1 wherein the outer pipe, the intermediate pipe and the inner pipe are formed by a method from a group consisting of direct laser deposition (DLD), direct metal laser sintering (DMLS), selective laser sintering (SLS) and other similar suitable processes.

6. A fuel manifold and fuel injector arrangement as claimed in claim 1 wherein the thermally insulating medium is selected from a group consisting of air and other suitable thermally insulating medium having a thermal conductivity value less than the thermal conductivity of a material of the at least one fuel pipe segment.

7. A fuel manifold and fuel injector arrangement as claimed in claim 1 wherein the outer pipe comprising a thermally insulating coating on its outer surface.

8. A fuel manifold and fuel injector arrangement as claimed in claim 1 wherein the fuel manifold and fuel injector arrangement comprise a plurality of fuel injectors including the at least one fuel injector and a plurality of fuel pipe segments including the at least one fuel pipe segment.

9. A fuel manifold and fuel injector arrangement as claimed in claim 8 comprise a first fuel injector and a second fuel injector of the plurality of fuel injectors, each of the first fuel injector and the second fuel injector has a first fuel nozzle and a second fuel nozzle, the second chamber of the at least one pipe segment fluidly interconnects the second fuel nozzle of the first fuel injector and the second fuel nozzle of the second fuel injector, the third chamber of the of the at least one pipe segment fluidly interconnects the first fuel nozzle of the first fuel injector and the first fuel nozzle of the second fuel injector and the at least one fuel pipe segment is arcuate.

10. A fuel manifold and fuel injector arrangement as claimed in claim 9 wherein each of the at least one fuel pipe segment interconnects two adjacent fuel injectors of the plurality of fuel injectors or each of the at least one fuel pipe segment interconnects alternate fuel injectors of the plurality of fuel injectors.

11. A fuel manifold and fuel injector arrangement as claimed in claim 10 wherein each of the at least one fuel pipe segment that is arcuate curves substantially through 180° to form a C-shape or each of the at least one fuel pipe segment that is arcuate has two straight sections connected by a curved section which curves substantially through 180° to form a U-shape.

12. A fuel manifold and fuel injector arrangement as claimed in claim 9 wherein each end of each of the at least one fuel pipe segment is secured to a connector head of at least one of the plurality of fuel injectors.

13. A fuel manifold and fuel in actor arrangement as claimed in claim 12 wherein the each end of each of the at least one fuel pipe segment has a flange and the flange at the end of each of the at least one fuel pipe segment is secured to the connector head of at least one of the plurality of fuel injectors.

14. A fuel manifold and fuel injector arrangement as claimed in claim 12 wherein the connector head of at least one of the plurality of fuel injectors has two connectors, the each end of each of the at least one fuel pipe segment is secured to a respective connector on the connector head of at least one of the plurality of fuel injectors and the connectors are on the same face of the connector head or on opposite faces of the connector head.

15. A fuel manifold and fuel injector arrangement as claimed in claim 1 wherein the inner pipe is divided into a first inner pipe chamber and a second inner pipe chamber, and each of the first inner pipe chamber and the second inner pipe chamber within the inner pipe of the at least one fuel pipe segment is fluidly connected to the first fuel supply.

16. A fuel manifold and fuel injector arrangement as claimed in claim 15 wherein the second fuel nozzle of each of the at least one fuel injector is fluidly connected to the second chamber of the at least one fuel pipe segment, the first fuel nozzle of each of a plurality of the fuel injectors are fluidly connected to the first inner pipe chamber and the first fuel nozzle of each of the plurality of the fuel injectors are fluidly connected to the second inner pipe chamber.

17. A fuel manifold and fuel injector arrangement as claimed in claim 1 wherein the thickness of at least one of the outer pipe, the intermediate pipe and the inner pipe is non-uniform along its length to adjust vibrational response characteristics of the at least one fuel pipe segment.

18. A fuel manifold and fuel injector arrangement as claimed in claim 1 wherein the casing has at least one aperture, the at least one fuel injector comprises a fuel feed arm, the fuel feed arm has a flange and a connector head positioned radially outward of the casing at its outer end, the fuel feed arm extends through the at least one aperture in the casing and the flange is secured to the casing, the at least one fuel pipe segment has an end and the end of the at least one fuel pipe segment is secured to the connector head of the fuel feed arm.

19. A fuel manifold and fuel injector arrangement for supplying fuel into a combustion chamber, the combustion chamber having a casing, the fuel manifold and fuel injector arrangement comprising at least one fuel manifold and at least one fuel injector wherein the at least one fuel manifold is connected to the at least one fuel injector, the at least one fuel injector comprising a first fuel nozzle and a second fuel nozzle, the first fuel nozzle is a main fuel nozzle, the second fuel nozzle is a pilot fuel nozzle, the at least one fuel injector is a lean burn fuel injector, the first fuel nozzle and the second fuel nozzle positioned radially inward of the casing, the at least one fuel manifold positioned radially outward of the casing, the at least one fuel manifold comprising at least one fuel pipe segment, each of the at least one fuel pipe segment comprising an outer pipe, an intermediate pipe arranged within the outer pipe, an inner pipe arranged within the intermediate pipe, first interconnecting structures connecting the outer pipe and the intermediate pipe, second interconnecting structures connecting the intermediate pipe and the inner pipe, and the outer pipe, the intermediate pipe and the inner pipe comprise a single piece, a first chamber being defined between the outer pipe and the intermediate pipe, a vacuum or a thermally insulating medium being provided in the first chamber, a second chamber being defined between the intermediate pipe and the inner pipe, the second chamber being fluidly connected to a second fuel supply, a third chamber being defined within the inner pipe, the third chamber being fluidly connected to a first fuel supply, and the second fuel nozzle being fluidly connected to the second chamber of the at least one fuel pipe segment of the at least one fuel manifold and the first fuel nozzle being fluidly connected to the third chamber of the at least one fuel pipe segment of the at least one fuel manifold.

20. A fuel manifold and fuel injector arrangement as claimed in claim 19, wherein the pilot fuel nozzle and the main fuel nozzle are pre-filming fuel nozzles.

* * * * *